(12) United States Patent
Kim et al.

(10) Patent No.: US 12,113,182 B2
(45) Date of Patent: Oct. 8, 2024

(54) BATTERY COOLING SYSTEM AND METHOD FOR GENERATING THERMAL MODEL THEREOF

(71) Applicants: Hyundai Motor Company, Seoul (KR); Kia Corporation, Seoul (KR); HYUNDAI MOBIS CO., LTD., Seoul (KR)

(72) Inventors: Yong Jae Kim, Suwon-si (KR); Gun Goo Lee, Suwon-si (KR); Hye Su Lim, Suwon-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 425 days.

(21) Appl. No.: 17/529,687

(22) Filed: Nov. 18, 2021

(65) Prior Publication Data
US 2022/0336870 A1 Oct. 20, 2022

(30) Foreign Application Priority Data
Apr. 19, 2021 (KR) .......................... 10-2021-0050558

(51) Int. Cl.
*H01M 10/42* (2006.01)
*G06F 1/20* (2006.01)
(Continued)

(52) U.S. Cl.
CPC ........ *H01M 10/4285* (2013.01); *G06F 1/206* (2013.01); *H01M 10/486* (2013.01);
(Continued)

(58) Field of Classification Search
CPC ........... H01M 10/4285; H01M 10/615; H01M 10/613; H01M 10/625; H01M 10/63;
(Continued)

(56) References Cited

U.S. PATENT DOCUMENTS

| 11,764,419 B1* | 9/2023 | Hu | H01M 10/613 |
| | | | 429/120 |
| 2013/0052490 A1* | 2/2013 | TenHouten | B60H 1/00278 |
| | | | 429/50 |

(Continued)

*Primary Examiner* — Md Abul Azad
(74) *Attorney, Agent, or Firm* — Morgan, Lewis & Bockius LLP

(57) ABSTRACT

A battery cooling system includes: a heating element for performing a resistance function of a battery to be subjected to a cooling test; a heating-load controller for controlling a heating load of the heating element according to a thermal model; an environment controller for controlling at least one battery cooling environment parameter such as outdoor temperature and initial temperature; a power supply for applying a current for each evaluation condition by connecting a charger/discharger to the heating element; a cooling processing part for supplying a cooling fluid such as air, coolant, or a refrigerant at a constant temperature and flow rate; and a cooling performance determination part for measuring a temperature of a battery cell over time and determining whether a target performance of the battery is satisfied.

9 Claims, 6 Drawing Sheets

(51) Int. Cl.
*H01M 10/48* (2006.01)
*H01M 10/613* (2014.01)
*H01M 10/615* (2014.01)
*H01M 10/625* (2014.01)
*H01M 10/63* (2014.01)
*H01M 10/6571* (2014.01)

(52) U.S. Cl.
CPC ....... *H01M 10/613* (2015.04); *H01M 10/615* (2015.04); *H01M 10/625* (2015.04); *H01M 10/63* (2015.04); *H01M 10/6571* (2015.04); *H01M 2220/20* (2013.01)

(58) Field of Classification Search
CPC ........... H01M 10/6571; H01M 10/486; H01M 2220/20; G06F 1/206
USPC ........................................................ 700/300
See application file for complete search history.

(56) References Cited

U.S. PATENT DOCUMENTS

| | | | |
|---|---|---|---|
| 2014/0266038 A1* | 9/2014 | Gibeau | B60L 53/52 320/109 |
| 2015/0280294 A1* | 10/2015 | Shin | B60L 58/26 429/50 |
| 2018/0141458 A1* | 5/2018 | Jammoul | H01M 10/63 |
| 2018/0147953 A1* | 5/2018 | Lee | B60H 1/00278 |
| 2020/0220240 A1* | 7/2020 | Cheng | H01M 10/6556 |
| 2021/0126304 A1* | 4/2021 | Shao | H01M 10/627 |
| 2021/0210810 A1* | 7/2021 | Chuang | B60L 1/02 |
| 2023/0226948 A1* | 7/2023 | Ozcelik | H01M 10/613 700/300 |

* cited by examiner

BATTERY COOLING SYSTEM AND METHOD FOR GENERATING THERMAL MODEL THEREOF

CROSS REFERENCE TO RELATED APPLICATION

The present application claims the benefit of priority to Korean Patent Application No. 10-2021-0050558, filed on Apr. 19, 2021 in the Korean Intellectual Property Office, the entire contents of which is incorporated herein for all purposes by reference.

TECHNICAL FIELD

The present disclosure relates to a battery cooling system and, more particularly, to a battery cooling system, which is used as a tester of an xEV high-voltage battery cooling system, and a method for generating a thermal model of the battery cooling system.

BACKGROUND

In general, an xEV high-voltage battery cooling system is a system that enables a high-voltage battery to remain within recommended temperature during charging or discharging, so as to exhibit optimal performance.

Battery temperature may be affected by environmental temperature, and under a high-load condition in which heat is rapidly generated, such as rapid charging and high-speed driving, a battery is vulnerable in terms of its durability, and a thermal runaway reaction may occur in the battery.

Therefore, efficient thermal management is required to secure battery lifespan and reliability thereof.

As such, the importance of a battery cooling system, serving as a high-efficiency thermal management technology, is emerging.

Meanwhile, a battery cooling performance test is for testing cooling performance of a cooling system for a high-voltage battery.

Such a conventional battery cooling performance test is performed under predetermined environmental conditions such as outdoor temperature and initial temperature, wherein a high-voltage charger/discharger is connected to a battery pack to apply current for each evaluation condition, and then cooling fluid such as air, coolant, or refrigerant is supplied at a constant temperature and flow rate, so as to measure temperature of a battery cell over time and determine whether target performance is satisfied.

However, a possibility of thermal runaway reaction is always inherent in lithium-ion batteries due to their characteristics. That is, under the high-load condition in which heat is rapidly generated, the heat is unable to be managed, and thus in a case where an internal short circuit occurs or battery temperature rises, ignition occurs, thereby increasing a risk of fire and causing a thermal runaway phenomenon.

Due to the characteristics of lithium-ion batteries, when a lithium-ion battery is directly used in a cooling system, the thermal runaway phenomenon occurs in the lithium-ion battery during a test, whereby there is a problem in that the cooling system may not be operated smoothly under a high-load condition.

The information disclosed in the Background section above is to aid in the understanding of the background of the present disclosure, and should not be taken as acknowledgement that this information forms any part of prior art.

SUMMARY

The present disclosure is to solve the conventional problem, and an objective of the present disclosure is to provide a battery cooling system that allows a battery to be replaced even under a high-load condition in which a thermal runaway phenomenon occurs during battery cooling performance is measured.

Another objective of the present disclosure is to provide a battery cooling system that may safely perform a test of a cooling processing part by using a battery substitute that does not cause a thermal runaway phenomenon when testing the cooling processing part of a battery under a high-load condition.

The objectives of the present disclosure are not limited to the objectives mentioned above, and other objectives not mentioned herein will be clearly understood by those skilled in the art from the following description.

A battery cooling system according to an exemplary embodiment of the present disclosure for achieving the above objective includes: a heating element configured to perform a resistance function of a battery to be subjected to a cooling test; a heating-load controller configured to control a heating load of the heating element according to a thermal model; an environment controller configured to control at least one battery cooling environment parameter including an outdoor temperature and an initial temperature; a power supply configured to apply a current for each evaluation condition by connecting a charger/discharger to the heating element; a cooling processing part configured to supply cooling fluid at a constant temperature and flow rate; and a cooling performance determination part configured to measure a temperature of a battery cell over time and to determine whether a target performance of the battery is satisfied.

The heating element may include: a body including metal; and a heating wire inserted into the body to enable temperature control of the body and constantly generate heat by a DC voltage supplied from the power supply.

According to whether temperature changes of the battery B or the heating element D over time t match each other, the heating-load controller may preferably control heating resistance of the heating element through a height H with respect to an area A of a battery module, so as to provide heat capacity obtained by multiplying mass and specific heat.

In a case of the heating element for the matching, the heating load of the heating element may be obtained by using evaluation data, and in a case of the battery, whether or not the heating load is matched may be determined based on thermal model analysis data using specification information of a cell manufacturer and a thermal fluid analysis program.

A method for generating a thermal model of a battery cooling system according to the exemplary embodiment of the present disclosure includes steps of: determining a shape of a heating element D according to a specification of a battery B; setting variables of heating resistance of the heating element according to the thermal model; calculating a temperature change of the battery B and a temperature change of the heating element D over time t for a designed cooling processing part; determining whether the calculated temperature change of the battery B and the calculated temperature change of the heating element D are the same as each other; and performing a test of the cooling processing part of the battery by using the heating element and generating the thermal model by using a test result value when the calculated temperature changes of the battery and the heating element are the same as each other.

Whereas, when the temperature change of the battery B and the temperature change of the heating element D are different from each other, variables of the thermal model may be reset, and then a process of calculating the temperature changes may be performed so that the temperature change of the battery B and the temperature change of the heating element D correspond to each other at the same level.

In addition, in the determining of the shape of the heating element, a height H of the heating element may be determined with respect to an area A of a battery module.

A heating element according to the exemplary embodiment of the present disclosure includes: a body including metal; and a heating wire inserted into the body to enable temperature control of the body and constantly generate heat by a DC voltage supplied from a power supply.

According to an exemplary embodiment of the present disclosure, there is an effect of solving the problem in which a test may not be completed due to a thermal runaway phenomenon occurring in a test object when a battery cooling system is tested under a high-load condition.

For this reason, the present disclosure has an effect of minimizing the number of tests and reducing the cost and time due to iterative design.

In addition, the present disclosure has an effect of improving performance and lifespan of a battery by developing a high-efficiency cooling system.

DETAILED DESCRIPTION

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Meanwhile, the terminology used herein is for the purpose of describing particular exemplary embodiments only and is not intended to be limiting of the present disclosure. In this specification, the singular form also includes the plural form unless otherwise specified in the phrase. In "comprises" and/or "comprising" as used in the specification, mentioned components, steps, actions and/or elements does not exclude the presence or addition of one or more other components, steps, actions and/or elements.

Figure 1:
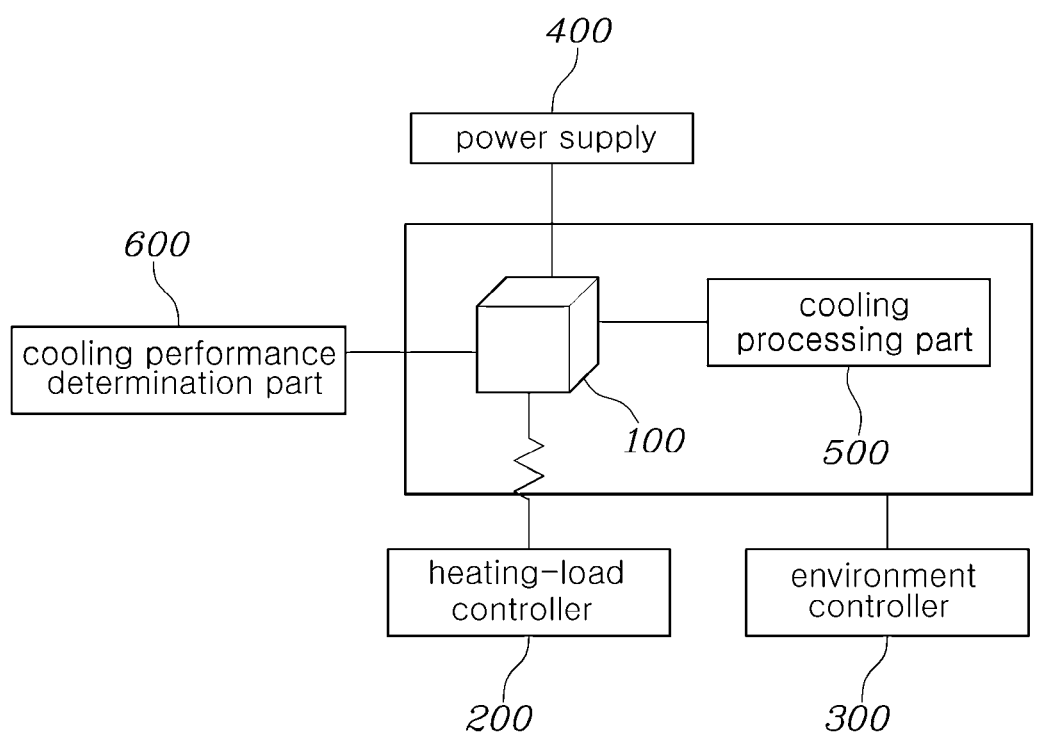
FIG. 1 is a functional block diagram showing a battery cooling system according to an exemplary embodiment of the present disclosure.

FIG. 1 is a view showing a battery cooling system according to the present disclosure. As shown in FIG. 1, the battery cooling system according to the exemplary embodiment of the present disclosure includes: a heating element 100, a heating-load controller 200, an environment controller 300, a power supply 400, a cooling processing part 500, and a cooling performance determination part 600.

According to one exemplary embodiment of the present disclosure, each of the heating-load controller 200, the environment controller 300, the cooling processing part 500, and the cooling performance determination part 600 may be a processor (e.g., computer, microprocessor, CPU, ASIC, circuitry, logic circuits, etc.). The controller may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). In some examples, the above modules 200, 300, 500 and 600 may be implemented by a single processor having an associated non-transitory memory storing software instructions which, when executed by the processor, provides the functionalities thereof.

Figure 2:
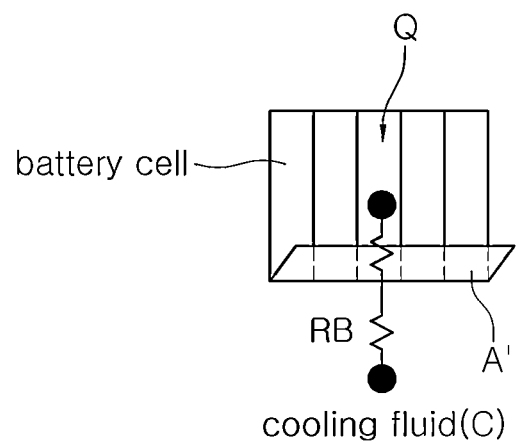
FIG. 2 is a reference view showing a battery module applied to a general battery cooling system.
Figure 3:
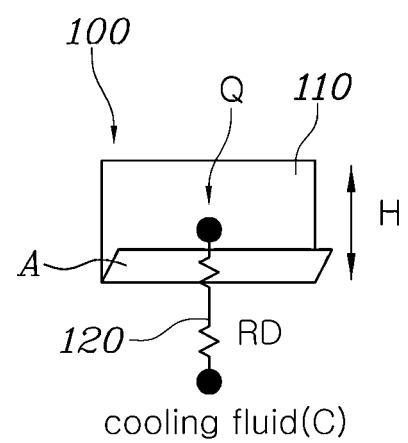
FIG. 3 is a reference view showing a heating element of FIG. 1.

The heating element 100 performs a resistance function of a battery to be tested as shown in FIG. 2, and as shown in FIG. 3, the heating element 100 has a height H thereof determined with respect to an area A of a battery module to be replaced and performs the resistance function according to a charger/discharger to which power is applied from the power supply 400. Here, the heating element includes: a body 110 including metal; and a heating wire 120 that is inserted into the body 110 to enable temperature control of the body 110 and constantly generate heat by a DC voltage supplied from the power supply.

Figure 4:
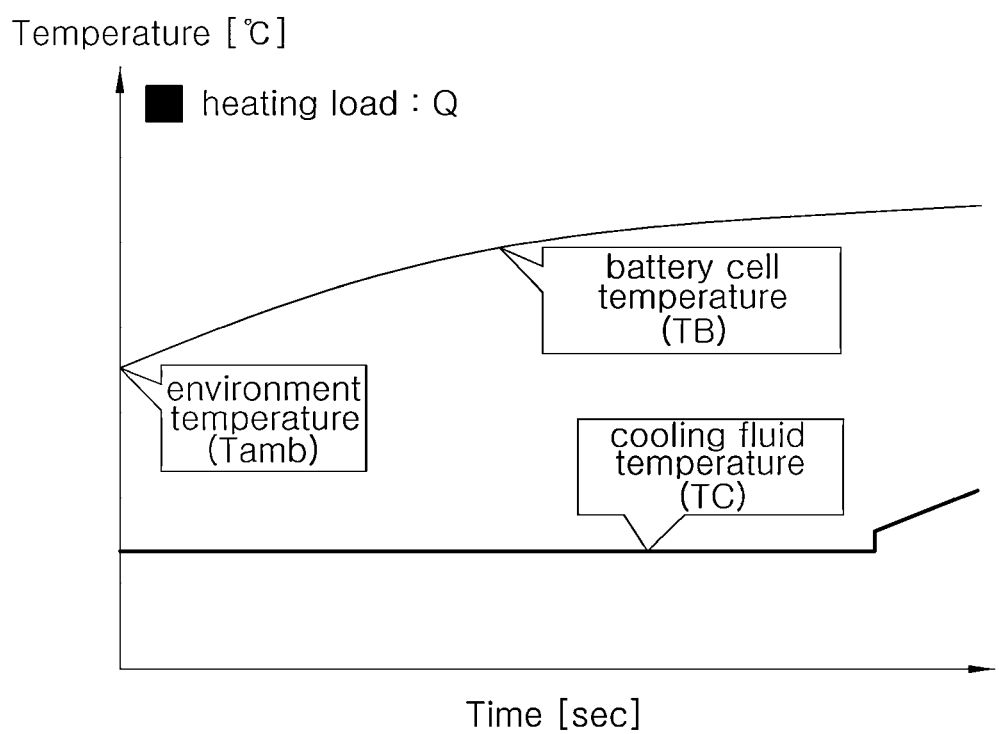
FIG. 4 is a graph showing a temperature change of battery cell due to the battery cooling system.
Figure 5:
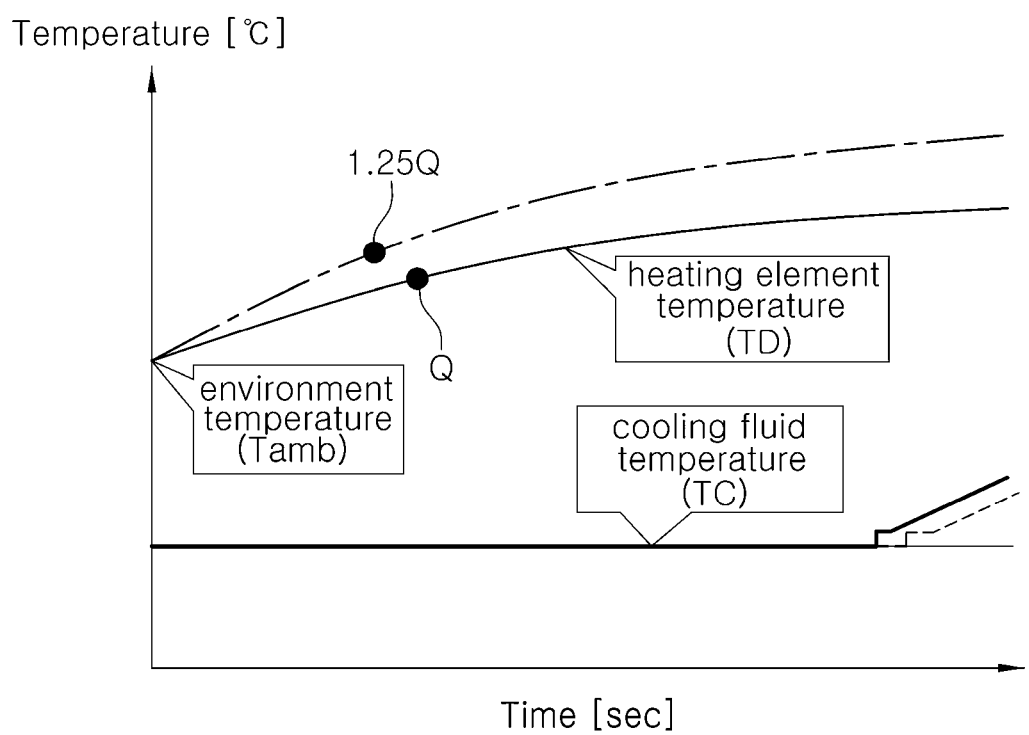
FIG. 5 is a graph showing a temperature change of the heating element of the battery cooling system according to the exemplary embodiment of the present disclosure.

In addition, the heating-load controller 200 controls heating load of the heating element 100 according to a thermal model, so that during a test, a heating condition of the heating element 100 is formed to be the same as that of the battery. Meanwhile, as shown in FIGS. 4 and 5, according to whether temperature changes of a battery B or the heating element 100 over time t are matched, the heating-load controller 200 preferably controls heating resistance of the heating element having the height H with respect to the battery module area A in accordance with a concept of thermal capacity (MC) in which mass is multiplied by specific heat.

In addition, the environment controller 300 controls at least one battery cooling environment parameter such as an outdoor temperature and an initial temperature when conducting a performance test of the battery cooling system.

The power supply 400 serves to connect a high-voltage charger/discharger to the heating element 100 to apply a current for each evaluation condition during the performance test of the battery cooling system.

The cooling processing part 500 serves to supply cooling fluid C such as air, coolant, or refrigerant at a constant temperature and flow rate during the performance test of the battery cooling system.

During the performance test of the battery cooling system, the cooling performance determination part 600 measures temperature of a battery cell over time and determines whether target performance is satisfied.

Figure 6:
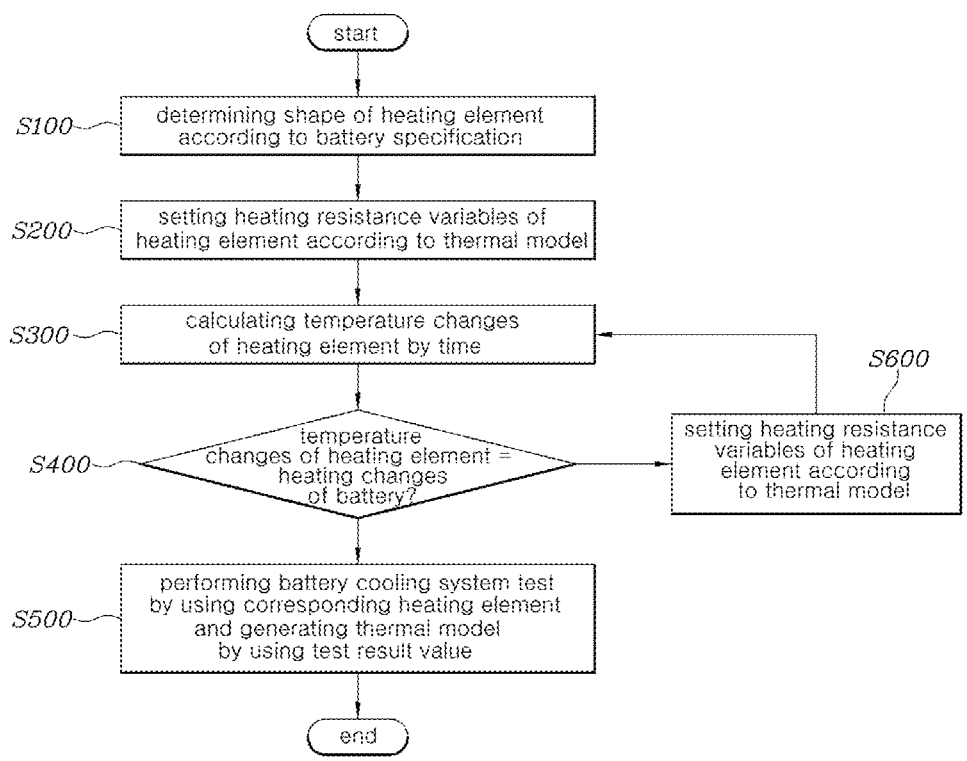
FIG. 6 is a flowchart showing a method for generating a thermal model of the battery cooling system according to the exemplary embodiment of the present disclosure.

Hereinafter, a method for generating a thermal model of a battery cooling system according to the exemplary embodiment of the present disclosure will be described with reference to FIG. 6.

First, in step S100, a shape of a heating element 100 according to a specification of a battery B is determined. In this case, by determining a height with respect to the same area as that of the battery B, the shape of the heating element 100 is determined.

Next, in step S200, variables of heating resistance of the heating element 100 are set according to the thermal model.

$$(MC)_B \frac{\Delta TB}{\Delta t} = Q + hA_{NC,B}(TB - T_{amb}) - \frac{1}{RB}(TB - TC) \quad \text{[Equation 1]}$$

$$(MC)_D \frac{\Delta TD}{\Delta t} = Q + hA_{NC,D}(TD - T_{amb}) - \frac{1}{RD}(TD - TC)$$

where MC is heat capacity, B is the battery, D is the heating element 100, $\overline{Q}$ is a heat load, h is a natural convective heat transfer coefficient, $A_{NC}$ is a natural convective heat transfer area, RB is thermal resistance of the battery, RD is thermal resistance of the heating element 100, TB is temperature of a battery cell, TC is temperature of cooling fluid, TD is temperature of the heating element 100, and Tamb is environment temperature.

Thereafter, in step S300, a temperature change of the heating element 100 for each time t is calculated according to operation of the designed cooling processing part 500.

Next, in step S400, it is determined whether the calculated temperature changes of the heating element 100 and the calculated temperature changes of the battery B corresponding to the heating element are the same with each other. Here, it is preferable that the temperature change of the battery is used based on thermal model analysis data using specification information of a battery cell manufacturer and a thermal fluid analysis program, and the temperature change of the heating element is used based on evaluation data.

In step S400 for determining temperature changes, when it is determined that the temperature changes are the same with each other (i.e., YES), step S500 is performed, in which a test for the battery cooling processing part 500 is conducted by using the heating element 100 and a thermal model is generated by using the test result value.

Whereas, when the temperature change of the battery B and the temperature change of the heating element 100 calculated in step S400 for determining temperature changes are different from each other (i.e., NO), variables of the thermal model are reset in step S600, and then a process of calculating temperature changes is performed so that the temperature changes of the battery B and the temperature change of the heating element 100 correspond to each other at the same level.

Therefore, the present disclosure has an effect that a test of a cooling processing part 500 may be performed by replacing a battery with an electric heating element to prevent the risk of fire due to rapid heating of a battery cell during a performance test for the development of a high-voltage battery cooling system for a vehicle.

The heating element 100 according to the exemplary embodiment of the present disclosure is provided with an input/output terminal, and includes: a body 110 including a metal material; and a heating wire 120 inserted into the body 110 to enable temperature control of the body 110 and constantly generate heat by a DC voltage.

In this way, the present disclosure has an effect that the performance of the cooling processing part 500 may be safely tested under a high-load condition in the battery cooling system by replacing the battery used in the cooling processing part 500.

In this way, the present disclosure generates a model that establishes a thermal correlation between the battery and the body 110 in the heating element 100, predicts temperature of the battery cell, and minimizes the number of tests, so that the conventional problems may be solved.

Meanwhile, in the exemplary embodiment of the present disclosure, a program for performing the thermal model is stored in a memory, and the processor executes the program stored in the memory.

In this case, the memory collectively refers to a non-volatile storage device and a volatile storage device that continuously maintain stored information even when power is not supplied.

For example, the memory may include: a NAND flash memory such as a compact flash (CF) card, a secure digital (SD) card, a memory stick, a solid-state drive (SSD), and a micro SD card; a magnetic computer storage device such as a hard disk drives (HDD); and an optical disc drive such as a CD-ROM and a DVD-ROM.

Alternatively, a program for executing the thermal model may be installed in a separate server computer and implemented in an interoperable form.

For reference, the components according to the exemplary embodiment of the present disclosure may be implemented in the form of software or hardware such as FPGA (Field Programmable Gate Array) or ASIC (Application Specific Integrated Circuit), and may serve predetermined roles.

However, "components" are not limited to software or hardware, and each component may be configured to reside in an addressable storage medium or to operate one or more processors.

Therefore, the components as an example include: components such as software components, object-oriented software components, class components, and task components; and other components such as processes, functions, properties, procedures, subroutines, segments of program codes, drivers, firmware, microcode, circuits, data, database, data structures, tables, arrays, and variables.

Components and functions provided within the components may be combined into a smaller number of components or further separated into additional components.

In this case, it will be understood that each block of flowcharts and combinations of the flowcharts may be performed by computer program instructions. Since these computer program instructions may be loaded in the processors of general purpose computers, special purpose computers, or other programmable data processing equipment, the instructions which are executed by the processors of the computers or other programmable data processing equipment will generate means for performing the functions described in the block(s) of the flowcharts. In order to implement functions in a particular manner, these computer program instructions may use a computer or other programmable data processing equipment, or may be stored in a computer readable memory, so the instructions configured to use the computer or stored in the computer readable memory are also possible to produce a manufactured article containing instruction means for performing the functions described in the block(s) of the flowcharts. Since the computer program instructions may be loaded on a computer or other programmable data processing equipment, it is also possible for the computer program instructions to provide steps for performing the functions described in the block(s) of the flowcharts, the instructions having a series of operational steps that are performed on the computer or other programmable data processing equipment, generating a process that is executed by a computer, and operating the computer or other programmable data processing equipment.

In addition, each block may also represent a module, a segment, or a part of codes that includes one or more executable instructions for executing a specified logical function(s). In addition, in some alternative exemplary embodiments, it should also be noted that the functions described in the blocks may also be performed out of order. For example, two blocks shown one after another may in fact be performed substantially simultaneously, or it is possible that the blocks are sometimes performed in a reverse order according to the corresponding function.

In this case, the term "~ part" used in the present exemplary embodiment means software or hardware components such as FPGA or ASIC, and the term "~ part" performs certain roles. However, "~ part" is not limited to software or hardware. The term "~ part" may be configured to reside in an addressable storage medium or may be configured to operate one or more processors. Accordingly, the term "~ part" as an example includes: components such as software components, object-oriented software components, class components, and task components; and other components such as processes, functions, properties, procedures, subroutines, segments of program codes, drivers, firmware, microcode, circuits, data, database, data structures, tables, arrays, and variables. The components and functions provided in "~ parts" may be combined into a smaller number of components and "~ parts" or further separated into additional components and "~ parts". In addition, components and "~ parts" may be implemented to operate one or more CPUs in a device or a secure multimedia card.

As above, the configuration of the present disclosure has been described in detail with reference to the accompanying drawings, but this is only an example, and it is apparent that various modifications and changes are possible within the scope of the technical spirit of the present disclosure by those skilled in the art to which the present disclosure pertains. Therefore, the protection scope of the present disclosure should not be limited to the above-described exemplary embodiments and should be defined by the description of the following claims.

What is claimed is:

1. A battery cooling system comprising:
   a heating element configured to perform a resistance function of a battery to be subjected to a cooling test;
   a heating-load controller configured to control a heating load of the heating element according to a thermal model;
   an environment controller configured to control at least one battery cooling environment parameter including an outdoor temperature and an initial temperature;
   a power supply configured to apply a current for each evaluation condition by connecting a charger/discharger to the heating element;
   a cooling processing part configured to supply a cooling fluid at a constant temperature and flow rate; and
   a cooling performance determination part configured to measure a temperature of a battery cell over time and to determine whether a target performance of the battery is satisfied,
   wherein the heating element is a battery substitute that does not cause a thermal runaway phenomenon when being subjected to the cooling test by replacing the battery under a high-load condition.

2. The battery cooling system of claim 1, wherein the heating element comprises:
   a body including metal; and
   a heating wire inserted into the body to enable temperature control of the body and constantly generate heat by a DC voltage supplied from the power supply.

3. The battery cooling system of claim 1, wherein, according to whether a temperature change of the battery and a temperature change of the heating element over time match each other, the heating-load controller controls heating resistance of the heating element through a height with respect to an area of a battery module, so as to provide heat capacity obtained by multiplying mass and specific heat.

4. The battery cooling system of claim 3, wherein, in a case of the heating element for the matching, the heating load of the heating element is obtained by using evaluation data, and
   in a case of the battery, whether or not the heating load is matched is determined based on thermal model analysis data using specification information of a cell manufacturer and a thermal fluid analysis program.

5. A method for generating a thermal model of a battery cooling system, the method comprising steps of:
   determining a shape of a heating element according to a specification of a battery;
   setting variables of heating resistance of the heating element according to the thermal model;
   calculating a temperature change of the battery and a temperature change of the heating element over time for a designed cooling processing part;
   determining whether the calculated temperature change of the battery and the calculated temperature change of the heating element are the same as each other; and
   performing a cooling test of the cooling processing part of the battery by using the heating element and generating the thermal model by using a test result value when the calculated temperature changes of the battery and the heating element are the same as each other,
   wherein the heating element is a battery substitute that does not cause a thermal runaway phenomenon when being subjected to the cooling test of the cooling processing part by replacing the battery under a high-load condition.

6. The method of claim 5, wherein, when the calculated temperature change of the battery and the calculated temperature change of the heating element are different from each other, variables of the thermal model are reset, and then
   a process of calculating the temperature changes is performed so that the temperature change of the battery and the temperature change of the heating element correspond to each other at the same level.

7. The method of claim 6, wherein, in the step of determining a shape of a heating element, a height of the heating element is determined with respect to an area of a battery module.

8. The battery cooling system of claim 2, wherein a shape of the heating element is determined according to a specification of the battery which is subjected to the cooling test and the heating element is replaced for during the cooling test.

9. The battery cooling system of claim 8, wherein a heating resistance of the heating element is controlled by a heating-load controller by determining a height of the heating element with respect to the same area as that of the battery.

* * * * *